Nov. 6, 1962  G. HERZOG  3,062,315
RADIO-LINK SYSTEM OF SEISMIC EXPLORATION
Filed Jan. 5, 1959  2 Sheets-Sheet 1

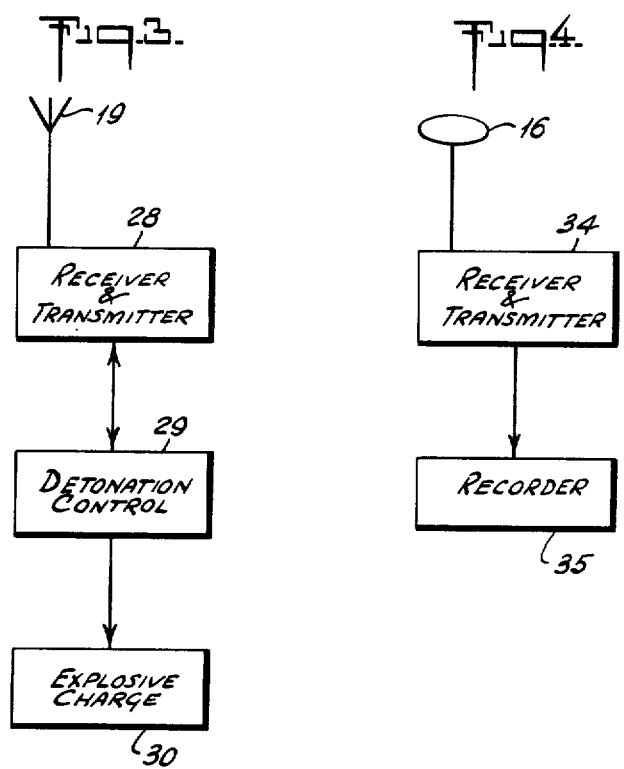

United States Patent Office 3,062,315
Patented Nov. 6, 1962

3,062,315
RADIO-LINK SYSTEM OF SEISMIC EXPLORATION
Gerhard Herzog, Houston, Tex., assignor to Texaco Inc., a corporation of Delaware
Filed Jan. 5, 1959, Ser. No. 784,938
4 Claims. (Cl. 181—.5)

This invention is concerned with radio transmission of seismic signals, in general, and more specifically deals with individually recording separate geophone station signals. The invention includes benefits which may be gained by reason of employing individual recording units at each geophone station.

Heretofore it has been suggested that radio transmission be employed for the individual geophone signals of a plurality of geophone stations, in order to eliminate the necessity for having an electrical cable connecting all of the geophone stations together for transmitting the signals from each geophone, or group thereof. All such previous suggestions have had the major drawback that it is necessary to employ a different radio frequency for each of the individual stations in order to be able to maintain the individual signals separate. This is a very serious drawback under modern seismic exploration conditions because it has been found to be the most expedient practice to employ a large number of individual geophone stations, e.g., on the order of twenty-four such stations. However, by following a method according to this invention, such drawback may be overcome so that only a single radio frequency need be employed for transmitting from all of the plurality of geophone stations.

Consequently, it is an object of this invention to provide a method of seismic exploration that is particularly applicable to use in difficult terrain, such that the conventional type of equipment becomes prohibitive if not impossible to use. The invention includes the use of a recorder in connection with each geophone station so that separate records are made of the seismic information as it is received by the individual geophone stations.

It is another object of the invention to provide for a radio-link seismic exploration method that employs individual radio transmitters for each of the plurality of geophone stations, and in addition includes a recorder at each such station such that the individual seismic signals that are received at these stations may be recorded simultaneously on separate records, and thereafter transmitted consecutively to be received at a single location for rerecording. The final record thus made which includes all of the individual signals, may be compounded for presentation as a standard seismic record for correlation of such signals. The compounding may be carried out in any feasible manner, e.g. in a replay system. Such compounding has been rendered feasible because of having transmitted originally a single time-base signal for being recorded with each of the individual records as they were made when the seismic energy was first recorded.

Briefly, the invention concerns a method of seismic exploration that employs radio transmission of seismic signals. The method comprises the steps of generating a seismic signal and making separate recordings of said signal as received at a plurality of geophone locations. The method also comprises transmitting a timing signal for receipt and recording at each of said geophone locations, and receiving and recording said timing signals on each of said separate recordings to provide a common time base. The method also comprises reproducing and transmitting said separate recordings consecutively.

The foregoing and other objects and benefits of the invention are set forth below in connection with a specific example. Such example is described in more detail below, and is illustrated in the drawings, in which:

FIG. 3 is a block diagram illustrating the elements that are included at the shot point station; and FIG. 4 is a block diagram illustrating the elements carried by the remote control station, that is, on the aircraft.

Figure 1:
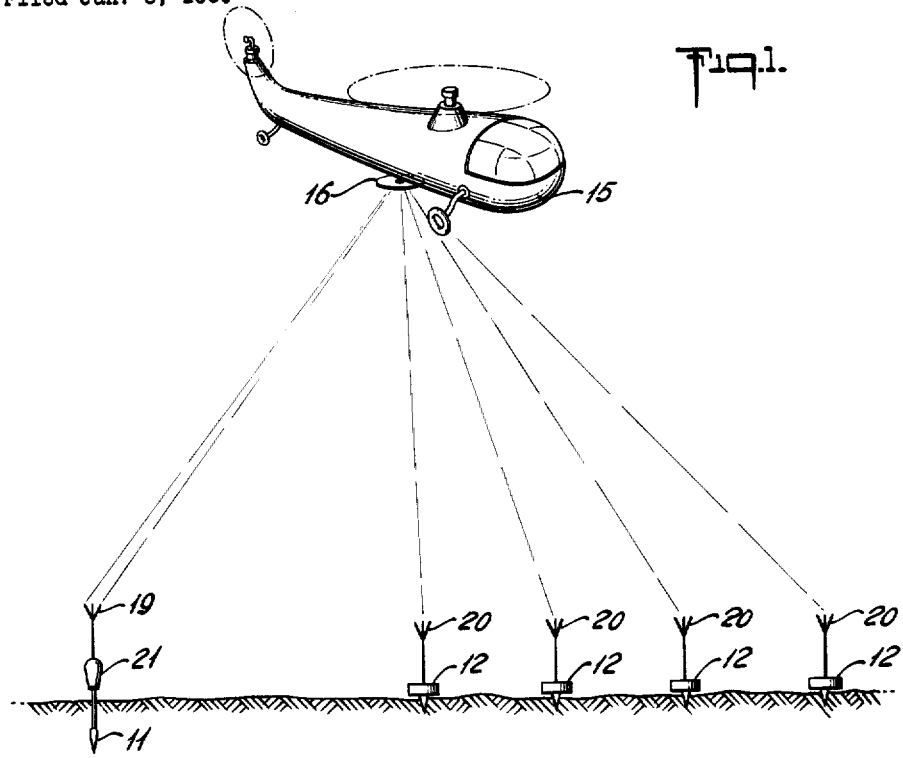
FIG. 1 illustrates a spread of geophone stations plus a shot point, all for making a seismic recording in connection with a remote station which is being transported by an aircraft.

Referring to FIG. 1 it is pointed out that there is shown a diagrammatic spread of seismic instruments, as required for making a seismic recording in accordance with the invention. It will be appreciated that there is ordinarily employed a larger number of individual geophone stations in seismic exploration work as it is carried out today. However, for the purposes of illustration the FIGURE 1 showing merely provides four separate geophone stations. Thus, it will be understood that any greater number of stations may be employed without altering the principles of the invention.

The spread illustrated in FIG. 1 includes a shot point 11. This is the location from which the seismic signals that are generated will be projected in all directions, so as to be received at the geophone stations. The seismic energy that is of interest includes both the first arriving energy and later arriving energies which may include reflections from sub surface strata.

There are four geophone stations 12 shown that are spaced from the shot point 11 along a predetermined line from the shot point. This line is usually laid out in advance; but so long as the location is known with sufficient accuracy, the seismic results can be related to the very location where the record was taken. It is contemplated that both the shot point 11 and the geophone stations 12 may have been laid out by dropping them into place from the air.

There is an aircraft 15 which carries a radio equipped station thereon, that provides for the control of the initiation of seismic signals at the shot point 11. This station aboard the aircraft 15 also provides for transmitting a timing signal that is to be recorded at each of the geophone stations 12, in order to have a common time base on each of the records that are made at the stations, as will appear more fully below.

It will be appreciated that the radio equipped station for carrying out the control function, plus the sending of a timing signal, need not be on an aircraft but could be located on a truck or any other type of mobile station which is preferably located in the general vicinity of the seismic spread involved.

In the illustrated embodiment the control station is located aboard the aircraft 15. It includes an antenna 16 for transmitting and receiving the radio signals involved. Equipment at the shot point 11 and the geophone stations 12, have individual antennas 19 and 20 respectively.

The equipment employed at the shot point 11 might take various forms, including a conventional shooting truck and its accoutrements. But, it is contemplated that in the most difficult terrain, an arrangement such as that illustrated may be employed. There is a droppable unit 21 that includes the various elements needed at the shot point, and has the explosive charge located close to the tip of the unit such that it will penetrate the earth to a considerable depth and thus provide generation of the desired seismic signals upon the detonation thereof.

Figure 2:
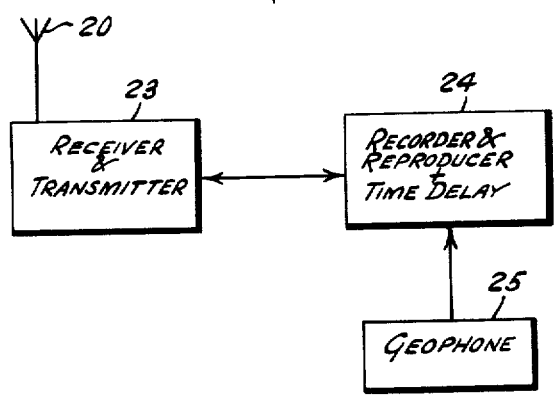
FIG. 2 is a block diagram illustrating the elements that are included in the equipment located at each geophone station.

FIG. 2 shows the elements that are included in the equipment located at each of the geophone stations 12, illustrated in FIG. 1. These elements may take various physical forms, and it is contemplated that they probably will be constructed using transistorized equipment for compactness as well as providing needed ruggedness and strength to withstand the relatively rough conditions which they are likely to encounter. The elements included in the apparatus are a radio receiver-and-transmitter 23, that has circuit connections for carrying signals both ways to and from a unit 24 that includes a recorder and reproducer, in addition to a time delay element. Also connected in circuit with the recorder of the unit 24, there is a geophone 25 which generates the electrical signals that correspond with the received seismic energy and transmits same to the recorder for recording of these signals. The recorder may take any feasible form, e.g. a transistorized magnetic tape or wire recorder. All of these elements are well known, and they form no part, per se, of the invention.

The elements that are located at the shot point 11 are shown in FIG. 3 in block diagram form. These include a radio receiver-and-transmitter 28 plus a detonation control circuit 29, in addition to an explosive charge 30 that is to be detonated thereby. Here again the elements may take any feasible form, and as such are well known so that no further description thereof need be provided here. As indicated above these elements form no part, per se, of the invention.

FIG. 4 indicates the elements that are included at the control station carried by the aircraft 15. These elements include a radio receiver-and-transmitter 34 that includes therewith equipment for generating a timing signal, that will be transmitted while the seismic energy is generated at the shot point 11 and thereafter, for receipt at each of the geophone stations 12. The receiver-and-transmitter 34 also includes therewith equipment for generating the necessary control signals that may be employed in commencing the operation with regard to detonating the charge at shot point 11, as well as starting up the recorders at each of the geophone stations 12. There is also a large capacity recorder 35 that is employed at the control station when it is receiving the individual recordings as they are transmitted from the geophone stations 12, after the shot has been recorded.

Once more, it is pointed out that the elements of FIG. 4, just described, are all individually well known; and that they constitute no part, per se, of the invention.

It is pointed out that a major benefit that is to be gained by this invention is the arrangement whereby all of the individual geophone station signals may be transmitted to the control station using only a single radio frequency carrier. This becomes possible because of the use of individual recorders for the separate geophone stations coupled with consecutive playback thereof.

The preferred arrangement described above employs time delay elements for each unit 24 at the geophone stations 12. These time delay elements are set relatively to one another such that the consecutive transmission of the recorded signals will be had as the records are played back and transmitted via the antennas 20 and the transmitters of elements 23.

The steps involved in carrying out the invention in accordance with the preferred embodiment being described, include the following details. First, the means for generating a seismic signal pulse is located at the shot point. This step may be carried out as indicated above, by means of having equipment constructed somewhat in the form of a lance so that the explosive charge is located near the tip of the sharp pointed lance-like structure. Thus the charge is imbedded relatively deeply beneath the surface of the earth at the shot point location, when the equipment is dropped from a substantial height.

The geophone stations are laid out by any convenient procedure, for example, by means of dropping the elements 12 from the aircraft 15 along a given line that usually radiates from the shot point 11.

It will be understood that the radio receiver equipment at each of the geophone stations 12, as well as that at the shot point 11, will be in condition for receiving radio energy as transmited from the control station on the aircraft 15. Also, at each geophone station 12 the geophone element 25 will be electrically connected to the recorder that is part of the element 24, ready to make a rcord of the seismic signals as picked up by the geophone 25.

After the spread (geophone stations) has been made, and the shot point is ready, the control station on the aircraft 15 will transmit radio signals including the timing signal. The timing signal is received by all of the geophone stations 12 at the same time, and when the recorders are operated they will make a record of this timing signal for the purposes of correlating the separate records that are made by the individual geophone stations. The beginning of this timing signal can be used to start the recorders, and preferably after a short delay, to fire the charge at the shot point 11. Next the instant of detonation of the charge will be transmitted from the transmitter 28 at the shot point unit 21. This shot instant transmission is in accordance with standard seismic practice for sending such shot time instant by radio to be recorded with the seismic data. Thus, the shot instant will be recorded at each of the geophone stations 12.

The recorders 24 at the geophone stations 12 will make a record of the signals that are generated by the geophone 25 in each case. It will be appreciated that each recorder 24 will have tracks for making separate records of the timing signal and the shot instant signal, as well as the seismic signals being received from the geophone 25. Of course, with some arrangements the timing signal and the shot instant signal may be recorded on the same track.

Once the explosive charge at the shot point 11 has been detonated, and the time break signal indicative thereof has been transmitted from the shot point via the antenna 19, the equipment in unit 21 at shot point 11 will have served its purpose for that recording. Thus this equipment may thereafter be picked up, or it may be left as expendable, if desired.

At each of the geophone stations 12 the equipment is arranged so that after a record has been made of the seismic energy that was generated at shot point 11, with the timing and time break signals thereon; the equipment will automatically switch over so as to make a reproduction of the recorded data after a given time delay, as determined by the time delay element of unit 24. As such reproduction is made, it will be transmitted from the element 23 via the antenna 20 so as to be received by the control station on the aircraft 15.

The time delay in each instance will be set so that the reproductions with broadcast, do not take place simultaneously with respect to the individual geophone station; but rather they take place consecutively in order that these transmissions may be made at the same radio frequency to provide for simplicity in the equipment required.

While the reproductions of the various individual geophone station records need not be in any particular order, it is important to identify each particular geophone station with its record and consequently it is preferred that the time delays employed be increased in order, from one end of the spread to the other.

At the control station on the aircraft 15, the signals transmitted from the geophone stations 12 will all be received by the receiver 34. These are then applied for recording by the recorder 35, so as to make a single permanent record which includes all of the seismic data that was picked up by each of the geophone stations 12 as in turn picked up by geophones 25. This data will be recorded as received, i.e., in consecutive form. Consequently, thereafter, in order to provide a proper and usable seismic record, the recording at the control station must be separated out and the individual records correlated so as to match them into the same time relationship as they had when they were simultaneously made originally.

The just mentioned separating and correlating may be carried out in various ways including manual separating of the individual records and laying them side by side with the time breaks all aligned.

It will be observed that the apparatus is illustrated in block diagram form for the reason that the particular apparatus employed may take numerous different forms. Thus, it is pointed out that the invention is not concerned with the structure of any of the apparatus per se, but rather is concerned with a method of seismic exploration that is an improvement over known methods of exploration wherein radio communication is the only link between each of the plurality of geophone stations and a single control station that makes the final entire record of a given seismic recording.

It is to be noted that the timing signal need not be broadcast from the control station on the aircraft 15. But, particularly if conventional shooting truck equipment is employed at the shot point instead of the droppable unit 21, the timing signal could be broadcast from the shot point along with and after the time break signal at the instant of the shot.

Another arrangement for obtaining the consecutive play back of the geophone station records, might be that employing a stand by condition of all of these records (geophone stations) at the end of the recording cycle. Then the control station would interrogate each geophone station in turn with a coded signal for causing play back of each record one at a time.

By way of summary and clarification of the invention, reference is made to the following particular steps of the method: (1) A charge of high explosive is detonated; or in some other feasible manner a seismic signal is generated at a given location near the surface of the earth. (2) An individual recording is made of the resulting seismic signals as received at each of a plurality of geophone locations that are spaced from the location where said original signal is generated. (3) A timing signal is transmitted from a single location, e.g. (in the illustrated showing), the aircraft 15. (4) The timing signal is received by the radio receivers at each of the geophone stations, and then this signal is demodulated and applied to a recording head for making a recording of such timing signal on the same record as the seismic signals which are being recorded on a separate track thereof. (5) The records made at each of the geophone stations are played back and transmitted via radio, after a predetermined time delay period following the end of the record in each case. The time delay for each individual geophone station is set up in advance, there being sufficient differences in delay time to provide for consecutive transmission of the records at each of the stations without any overlap. (6) The radio frequency employed in transmitting by radio transmitter the data that was recorded at each of the geophone stations, is the identical frequency for all of the separate geophone stations. This eliminates a large amount of complexity involved which is necessary if they are transmitted simultaneously. Such complexity has been found unavoidable heretofore because the data that is recorded is of very nearly the same character from one geophone station to the next, so that the signals of each station would be not intelligible if they were not maintained completely separate from one another. (7) The consecutive transmissions broadcast from each of the geophone stations, are all received and recorded at the control station on aircraft 15.

After step (7), the final recording is then subject to a rerun for reproducing the data in such a fashion that it may be correlated and matched to the same time base for properly reconstructing a seismic record from the data. It will be appreciated that the spacing of the recorded cycles of the timing signal, may not have been exactly constant throughout the length of the geophone station records, particularly as to the relation of one record to another. But, since the timing signal was recorded on each of these record from the single origin, any variations will be readily observed and correction or compensation may be made.

It will be appreciated that although the geophone stations have been illustrated with only one geophone at each, it might be arranged so that a group of geophones are connected together to provide the seismic signals that arrive at a given geophone station. This is in accordance with standard practice in reflection seismic exploration work, so need not be elaborated further.

While a particular embodiment of the invention has been described above in considerable detail in accordance with the applicable statutes, this is not to be taken as in any way limiting the invention but merely as being descriptive thereof.

What is claimed as the invention is:

1. Apparatus for seismic exploration employing radio transmission of seismic signals, comprising in combination means for generating a seismic signal, means remote from said signal generating means for making separate recordings of said signal as received at a plurality of geophone locations, means associated with said seismic signal generating means for transmitting a timing signal for receipt and recording at each of said geophone locations, radio means at each of said geophone locations for receiving and recording said timing signal on each of said separate recordings to provide a common time base, means associated with said geophone locations for reproducing and transmitting said separate recordings consecutively, said last named means employing the same carrier frequency for said last named consecutive transmissions of all of said geophone signals, and control station means for receiving and recording said consecutively transmitted reproductions on a single record for later correlation.

2. Apparatus for seismic exploration employing radio transmission of seismic signals, comprising means for generating a seismic signal, separate means for making an individual recording of said seismic signal as received at each of a plurality of geophone locations spaced from the location where said signal is generated, means associated with a control station for transmitting a timing signal for receipt and recording at each of said geophone locations, radio means at each of said geophone locations for receiving and recording said timing signal on each of said separate recordings to provide a common time base, and time delay means at each of said geophone locations for reproducing and transmitting said separate recordings consecutively.

3. Apparatus for seismic exploration employing radio transmission of seismic signals, comprising means for generating a seismic signal, means remote from said signal generating means for making an individual recording of said seismic signal as received at each of a plurality of geophone locations spaced from the location where said signal is generated, radio means for transmitting a timing signal for receipt and recording at each of said geophone locations, separate radio means at each of said geophone locations for receiving and recording said timing signal on each of said separate recordings to provide a common time base, time separation means associated with said separate radio means for reproducing and transmitting said separate recordings consecutively, and individual adjustment means at each of said separate radio means for employing the same radio carrier frequency for transmitting all of said reproduced separate recordings.

4. Apparatus for seismic exploration employing radio transmission of seismic signals, comprising means for generating a seismic signal, means remote from said signal generating means for making an individual recording of said seismic signal as received at each of a plurality of geophone locations spaced from the location where said signal is generated, master radio means for transmitting a timing signal for receipt and recording at each of said geophone locations, separate radio means at each of said geophone locations for receiving and recording said timing signal on each of said separate recordings to provide a common time base, time separation means associated with said separate radio means for reproducing and transmitting said separate recordings consecutively, said last named means employing the same radio carrier frequency in transmitting all of said reproduced recordings consecutively, and remote master recording means for receiving and recording said consecutively transmitted reproduction on a single record for later correlation.

References Cited in the file of this patent

UNITED STATES PATENTS

| | | |
|---|---|---|
| 1,902,650 | Legg | Mar. 21, 1933 |
| 2,265,513 | Burg | Dec. 9, 1941 |
| 2,700,753 | Peterson | Jan. 25, 1955 |
| 2,767,389 | McCollum | Oct. 16, 1956 |

OTHER REFERENCES

Gatland: "Project Satellite," published by Allan Wingate Limited, London, February 1958, pages 88, 89.

Nichols et al.: "Radio Telemetry," 2nd edition, published by John Wiley & Sons, Inc., New York, 1956, pages 10, 11.